Figure 1:
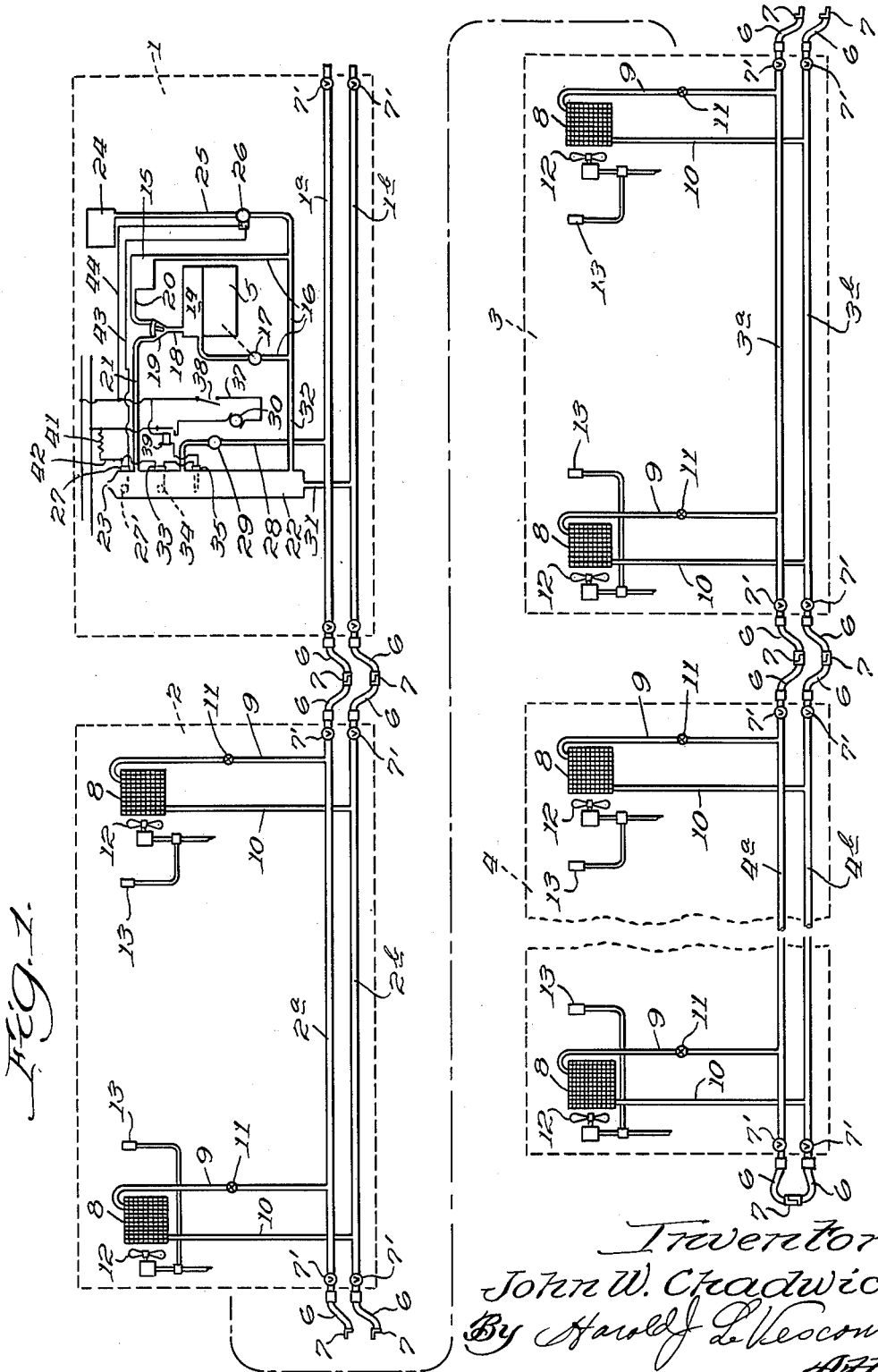

Jan. 10, 1956   J. W. CHADWICK   2,730,305
METHOD AND APPARATUS FOR HEATING TRAINS
Filed Jan. 14, 1952   3 Sheets-Sheet 3

Inventor:
John W. Chadwick.
By Harold LeVesconte
Atty.

United States Patent Office 2,730,305
Patented Jan. 10, 1956

2,730,305

METHOD AND APPARATUS FOR HEATING TRAINS

John W. Chadwick, Glendale, Calif.

Application January 14, 1952, Serial No. 266,361

25 Claims. (Cl. 237—5)

This invention relates to a method and apparatus for heating railway cars and trains by utilizing at least part of the waste heat given off by diesel engines or other forms of internal combustion power employing liquid cooling.

As present, passenger and other heated trains pulled by diesel locomotives or similar tractive power are heated by steam generated by an oil fired boiler or boilers carried by the locomotive units. The maximum consumption of steam for such purposes is about 300 lbs. of steam per car per hour, which roughly is equivalent to a required input of 300,000 B. t. u. per car per hour and a consumption of approximately 36 gallons of water per car per hour. The locomotive must carry both the boiler and sufficient supply of boiler fuel and water for long runs, making many tons of non-revenue producing weight, some of which must be hauled at all times of the year and this entire heavy mechanism must be employed in the summer time merely to supply hot water to the coaches.

In general, diesel-electric locomotives are made up of a plurality of power units, each unit having two diesel engines of about 800 B. H. P., and for the longest trains the motive power is derived from a series of three such power units coupled together. Each engine when operating under full load consumes about 48 gallons of fuel per hour, which is equivalent to an input of about 7,200,000 B. t. u. per engine per hour or about 43,200,000 B. t. u. per hour for a locomotive comprising three units or six engines.

Of this input, about 30% or 12,960,000 B. t. u. per hour is dissipated in the jacket water cooling of the engines through the radiators associated therewith and not allowing for a margin of safety, this dissipated heat would be more than sufficient to keep, say, 40 passenger cars heated under maximum demand conditions and it is to utilize at least part of this tremendous quantity of available heat with which this invention is concerned. Since the average passenger train seldom exceeds 20 cars in length, it is evident that the waste heat thus available is more than sufficient to keep the cars properly heated and it is further evident that for shorter trains with one or two power units the same safe excess of available heat over requirements will prevail.

With the foregoing considerations in mind, it is an object of the present invention to provide a method for heating railways cars utilizing the heated jacket water of the internal combustion engine or engines which furnish the motive power for the train as the heat transfer medium.

Another object of the invention is to provide an engine cooling apparatus for internal combustion engine powered locomotives in which the cooling of the engine jacket water is achieved by being circulated through the train while giving off heat and is then returned to the engine water jacket.

A further object of the invention is to provide an apparatus for using the cooling medium of the engines of a diesel electric or similar locomotive for heating the cars of the train pulled thereby, which apparatus is so constructed and arranged as to take only such heat as is required for car heating purposes and to automatically divert any excess heat to the engine radiator means for dissipation thereby.

Still another object of the invention is to provide a train heating system employing the jacket water of the engines of a diesel-electric or similar locomotive as a heat transfer medium which system includes automatic control devices effective to prevent the transfer of heat to the train when the heat of the jacket water is below the minimum temperature for optimum performance of the engines or when the supply of jacket water is insufficient.

A still further object of the invention is to provide a hot water train heating system deriving heat from the water jackets of the locomotive engines and of any auxiliary engines carried either by the locomotive or by the coaches and including outflow and return pipes extending along each car and adapted to be connected in series, together and, if needed, with a connection between said pipes at the rear end of the last car to form a completed circuit for the flow of heated engine jacket water from the engines through all of the cars and back to the engine.

Still another object of the invention is to provide a hot water heating system for trains employing the jacket water of diesel-electric or similar locomotives as a heat transfer medium which is so constructed and arranged that each engine is connected in series in the heating system and in parallel with each other engine and so that any engine or engines may be disconnected from the heating system while being continued to be used for power purposes.

Figure 2:
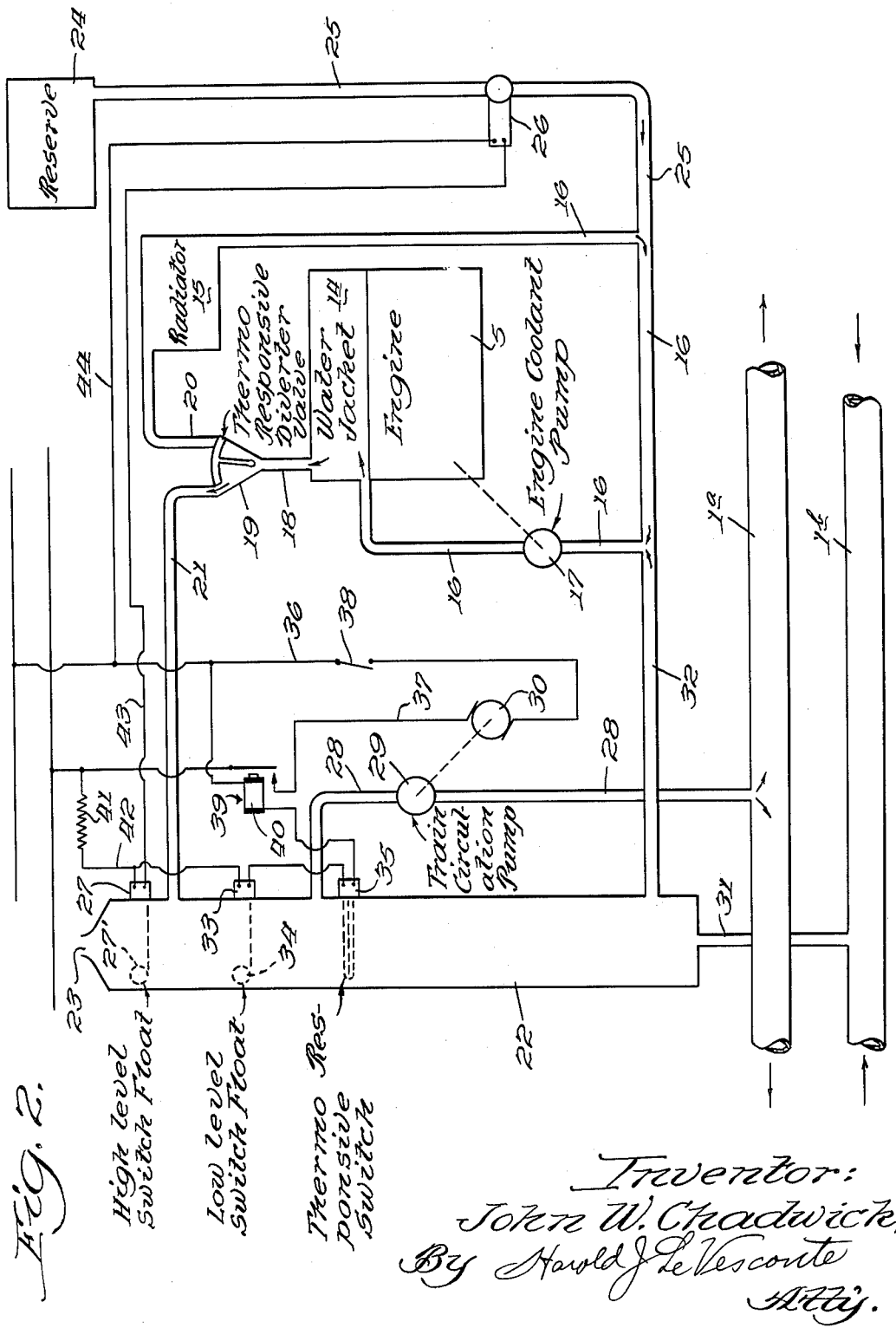
Figure 3:
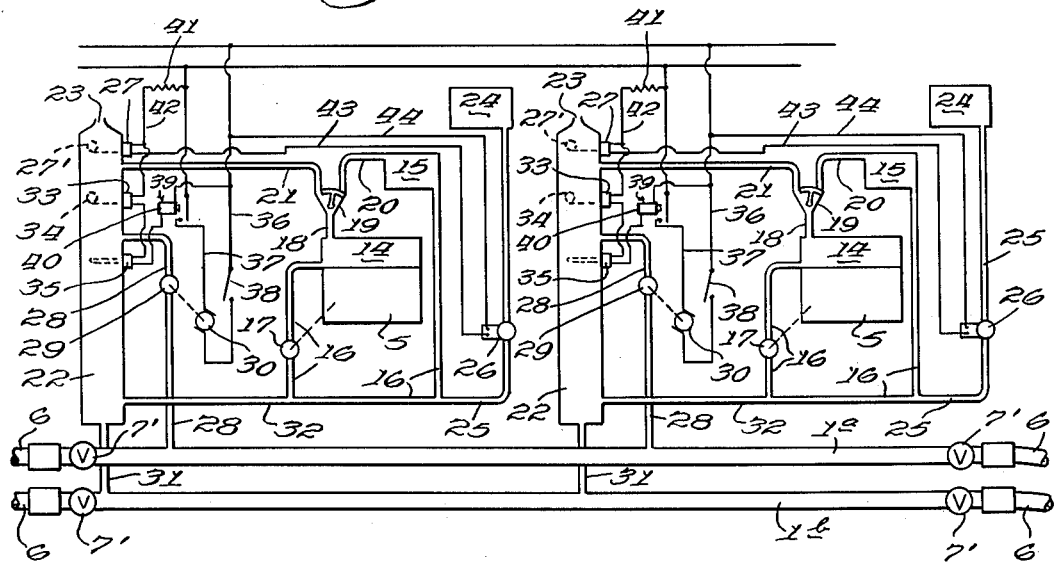
Figure 4:
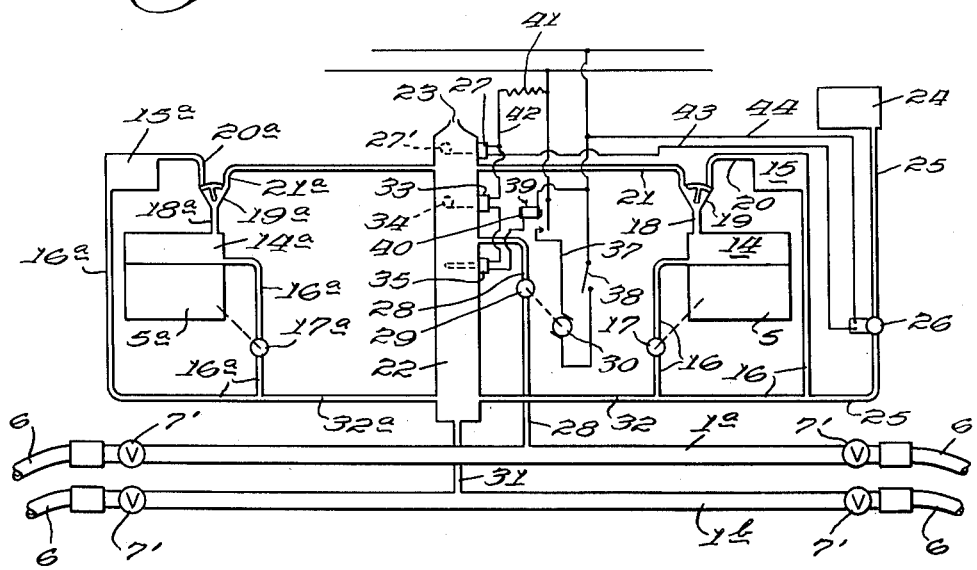

With the foregoing objects in view, together with such additional objects and advantages as may subsequently appear, the invention resides in the practice of the method as well as in the parts, and in the construction, combination and arrangement of parts disclosed, by way of example, in the following specification; reference being also had to the accompanying drawings which form a part of said specification and in which drawings:

Fig. 1 is a schematic representation of a train comprising a diesel locomotive and three cars having the heating system of the present invention applied thereto, Fig. 2 is an enlarged schematic view of the diesel engine shown in Fig. 1 and the associated heat collecting and regulating apparatus associated therewith, Fig. 3 is a schematic view of a two engine locomotive in which the two engines are coupled in parallel with each other to the train heating circulatory system, and Fig. 4 is a view similar to Fig. 3, but showing the two engines coupled to a single manifold which, in turn, is interposed in series between the outflow and return flow pipes of the heating system.

Referring first to Fig. 1, there is shown a locomotive 1 coupled to a train of three cars 2, 3 and 4; the locomotive having a power unit including an internal combustion engine 5 connected by any suitable means to the driving wheels of the locomotive. As such power transmission means are not necessary to explain the present invention, they are omitted from the drawings. The locomotive has an outflow pipe 1a and a return flow pipe 1b extending longitudinally and preferably along the underside of the frame thereof and the cars each have corresponding outflow pipes 2a, 3a and 4a and return flow pipes 2b, 3b and 4b. Each of the pipes at each end thereof terminates in a hose 6 having a suitable quick coupling means 7 for connection and disconnection with the corresponding coupling means on adjacent cars and the couplings on the ends of the pipes at each end of each car being adapted for interengagement to afford a means of interconnecting the ends of the pipes at the rear end of the train to effect, if desired, completion of the circulatory circuit for the heating system at the end of any car. Additionally, each of the outflow and return flow pipes on the locomotive and on each car adjacent the connection with the hose ends thereof is provided with a shutoff valve 7' to minimize the loss of water on uncoupling the cars from each other or from a locomotive. Optionally, this shutoff means may be combined with the hose interconnecting means to provide an automatic shutoff for the uncoupled hoses. Several such connectors are available and further description is not thought necessary here.

The heating system for each car comprises one or more radiators 8 connected in parallel between the outflow and return pipes of the car by pipes 9 and 10, respectively, the pipe 9 preferably being provided with a manually operable variable orifice valve 11 to regulate the rate of flow of water through the radiator. Associated with each radiator is a power driven fan 12 to effect a flow of air past the radiator 8; the operation of the fan being regulated by a thermostat actuated switch 13 in response to the needs of the car. In general the car heating means is about the same as for the heretofore used steam heating system except that the radiator is slightly larger due to the lower heat of the heating medium and that the radiator is connected to the return flow pipe instead of exhausting to the atmosphere as has been the practice heretofore. Also, by the use of suitable heat exchange apparatus, the hot water circulated through the train may be used to heat the water supply for the washrooms in each car.

Referring now to Fig. 2, the engine 5 includes a water jacket 14 and a radiator 15 preferably having the lower side thereof connected to the water jacket and preferably to the lower side thereof, by a conduit 16 with an interposed, engine driven, coolant circulating pump 17. The upper side of the water jacket is connected by a conduit 18 to the inlet opening of a thermo-responsive diverter valve 19 having two outlet openings and housing a thermo-responsive element effective to regulate the proportion and rate of flow through said outlet openings of which one is connected by a conduit 20 to the upper side of the radiator 15 and the other is connected by a conduit 21 to the upper portion of a vertically disposed manifold 22; the upper end of said manifold having an opening 23 to atmosphere at its uppermost end. Since thermo-responsive diverter valves are well known, it has been shown schematically only. A makeup reservoir 24 is connected to the engine cooling system at a low point in the system here shown as a conduit 25 connected to the conduit 16 between the radiator 15 and pump 17; there being an electrically operated valve 26 interposed in the conduit 25 connected electrically in series with a switch 27 operated by a float 27' in the upper end of the manifold, which switch is normally closed, holding the valve 26 open, and said switch being opened and allowing the valve 26 to close whenever the level of water in the manifold reaches a predetermined high level. Supply of heated water from the manifold 22 to the outflow pipe 1a of the locomotive is through a conduit 28 having an interposed train circulation pump 29 driven by an electric motor 30. The return flow pipe 1b is connected to the lower end of the manifold 22 by a conduit 31 and a conduit 32 connects the lower end of the manifold 22 with the conduit 16 between the radiator 15 and the engine coolant pump 17. In the practice of the method herein disclosed, especially in the case of very long trains, it may be desirable to offset line pressure drop by the use of booster pumps in the "a" lines of at least some of the cars. Since the use of booster pumps in long fluid lines is a well known practice, illustration thereof is not deemed to be necessary.

The manifold 22 may be provided with a low level switch 33 operated by a float 34 disposed slightly above the juncture of the conduit 28 with the manifold and is also provided with a thermo-responsive switch 35 disposed below said juncture. The motor 30 is connected by leads 36 and 37 with a source of electrical energy as, for example, a generator driven by the engine 5 to energize the train electrical system, the lead 36 having a manually operable switch 38 and the lead 37 being subject to be opened or closed by a relay 39.

The low level switch 33 and the thermo-responsive switch 35 are connected in series with the field coil 40 of the relay 39 through a circuit extending between the leads 36 and 37 with resistor 41 interposed between them and the power source and so long as the water level in the manifold is sufficiently high to keep the switch 33 closed and is sufficiently high in temperature to cause the switch 35 to remain closed, the armature 40 of the relay 39 will be energized and maintain the power circuit for the train circulation pump motor 30 closed except for control by the manual switch 38. The circuit for the solenoid valve 26 comprises a lead 42 extending from the resistor 41 to one side of the switch 27, a second lead 43 extending from the other side of the switch 27 to the armature of the valve 26 and a third lead 44 extending from the valve 26 to the power source so that the operation of the valve is not affected by the manual switch 28.

The operation of the apparatus is as follows: Assuming that the locomotive and engine 5 are cold, upon starting the engine and its associated coolant pump 17 the circulation of jacket water will be from the water jacket 14 through the conduit 18 to the thermo-responsive diverter valve 19 which in response to temperatures of less than, say, 180° F. will divert all water through the conduit 21 to the manifold 22; the pump 17 drawing water from the bottom of the manifold 22 through the conduit 32 and thence through the conduit 16 from the juncture therewith and thence into the lower portion of the water jacket. If the switch 38 should be closed at this time, the motor 30 would be prevented from operating until the circuit was closed by the switch 35 which is set to close at about 160° F. If at that time the level of water in the manifold happened to be below that maintained by the low level switch 34, the motor 30 would still be prevented from operating until the level was restored from the reserve tank 24. The pump 29 upon operation delivers heated water from the manifold 22 through the conduit 28 to the outflow pipe 1a of the locomotive and thence through the outflow pipes of the various cars to the rear end of the train, at which point the interconnected hoses 6 of the outflow and return pipes complete the circuit and the water then is returned by the return pipes of the cars to the return pipe 1b of the locomotive and then flows through the conduit 31 to the lower end of the manifold 22 for recirculation. Most of the returned water will be drawn through the conduit 32 for circulation through the water jacket of the engine. In each car, some portion of the outflow water will be circulated through the car radiators through the conduits 9 and 11 and bypassed to the return pipes but the rate of flow maintained by the train circulation pump 29 is sufficiently greater than the rate of flow through all of the car radiators to maintain a steady flow through the outflow and return pipes. So long as the valve 11 is open at all, the radiator associated therewith will be heated but the heat will be localized until and unless the fan associated therewith is caused to operate. The valves 7', 7' at the forward end of the locomotive outflow and return pipes are of course closed to prevent loss of water. When and if the temperature of the water rises to about 180° F., the diverter valve 19 begins to close the conduit 21 and to open the conduit 20 to permit a portion of the water to flow through the conduit 20 to the radiator 15 and thence back to the water jacket through the conduit 16. When there is no circulation through the train or very little such as to supply heat for the washing water, the valve 19 will divert all or almost all of the jacket water to the radiator to dissipate the heat. Since the operating means for the control valve 26 for the make-up reservoir 24 is independent of the control circuit for the train circulation pump motor 29, the complete cutting out of the train circulation will not affect the operation of the makeup reservoir. It is particularly to be noted that when make up is required, the delivery of make up fluid is to the water jacket entrant side of the engine circuit with resultant heating of makeup fluid before it enters the car heating circuit. As before pointed out, since the available amount of heat from the locomotive engines is at least twice as much as can be used under maximum demand conditions by any train the engines are capable of pulling, after the train is heated up, the diverter valve 19 is generally constantly diverting a portion of the coolant to the engine radiator and under conditions of no train demand the entire circulation and heat dissipation is through the engine radiator 15. As is usual for purposes of engine coolant, the water may contain an antifreeze solution and the valves 7', 7' at each end of each car will permit the cars to be uncoupled with a minimum loss of water, the presence of said antifreeze solution preventing damage to the heating system when the car is set out for any length of time in cold climates.

Fig. 3 shows an arrangement for connecting the cooling systems of the two engines of a power unit separately to the outflow and return flow pipes of the locomotive. Consequently the same numerals have been applied to all identical parts. From this showing, it is obvious that several power units may be similarly coupled in parallel relation to the outflow and return flow pipes with each engine drawing a portion of the car circulation water from the return flow pipe and returning it to the outflow pipe. Additionally, auxiliary engines in the locomotive or in the coaches may be similarly connected to said pipes. Each engine of the power unit has its own manifold and train circulation pump and if the output of only one engine is required to keep the train circulation portion of the system in operation, the train circulation pump of the other engine may be stopped, after which such engine will have the coolant therefor diverted entirely to the radiator 15 for that engine.

In Fig. 4 there is shown a modification of the invention as it is applied to the two engines of a power unit. In this form of the invention, the two engines have their cooling systems connected to a single manifold having a single train circulation pump and a single set of controls therefor. The system is simpler than that shown in Fig. 3 and may be preferred for that reason at the expense of a slight loss in flexibility of response to external demand conditions and the remote disadvantage that a failure of the single set of train circulation pump motor controls would adversely affect the train heating output of two engines rather than only one engine as with the arrangement shown in Fig. 3. In this figure all identical elements lying in the same relative positions as in the preceding figures have been given the same numerals and the added engine and associated elements have been given the same numerals with the added exponent "a."

While under some conditions the outflow and return pipes may be interconnected at the rear end of the train, under average conditions the cross flow betweeen these pipes at the car radiators will be found adequate except for long trains in extreme cold weather.

Thus the foregoing invention, in the disclosed embodiment thereof, affords both a method and apparatus for the utilization of the heat of the jacket water of the engines of a diesel-electric locomotive to supply heat to the cars of a passenger or other train pulled by the locomotive, doing away with the extra boiler and its fuel and water. Not only is the non-revenue load reduced, but also the heat employed is that which has heretofore been wasted. Furthermore, the system is such as to permit ready conversion of existing equipment to the use of hot water heat. The controls are simple and effective to regulate the operation of the apparatus within close limits and the operating efficiency of the engines is not impaired by the added use of the jacket water since circulation thereof through the train is impossible when the water is below the optimum temperature for efficient engine performance.

While in the foregoing specification I have described and illustrated certain embodiments of my invention, it is appreciated that in the light of the foregoing disclosure modifications may occur to those skilled in the art. For example, the terms "engine" or "internal combustion engine" are intended to include all types of prime movers which depend on internal combustion, whether employing reciprocating pistons or other means such as turbine rotors, so long as heat is developed requiring dissipation by means of a circulating liquid coolant. Further, the type of coolant may be any suitable liquid such as water, with or without additives to prevent freezing or corrosion, or any other liquid that may be suitable for the primary purpose of maintaining the "engine" at an optimum operating temperature. Therefore, having in mind the above-expressed intended scope of the terms "engine" and "liquid" or the equivalent expressions such as "prime mover" or "fluid," it is to be understood that the invention embraces not only the exact forms above disclosed, but also includes in its scope all such modifications in the method and in the parts of the apparatus and the construction combination and arrangement of such parts as shall come within the purview of the appended claims.

I claim:

1. In a method of heating the interiors of railway cars in trains pulled by locomotives powered by internal combustion prime mover means cooled by a liquid circulation system; said method comprising diverting at least a part of the engine cooling liquid as it leaves an engine from its normal circulation path and into a car heating circulation path extending from the engine along the train to the rearmost car to be heated and thence back to the engine, drawing off portions of the diverted liquid at at least some of the cars between the locomotive and the rearmost car of the train, passing the drawn off portions of liquid through heat exchanging devices disposed within the cars at which the liquid is drawn off, and returning the drawn off portions of liquid to the side of said car heating circulation path en route from the rearmost car to the engine, the improvement which comprises providing a make up liquid supply and introducing make up liquid into that part of the system between the return portion of the car heating circulation path and the engine.

2. In a method of heating the interior of railway cars in trains pulled by locomotive powered by internal combustion prime mover means having combustion chamber cooling means including a liquid circulation system and a heat dissipating radiator; said method comprising diverting at least a portion of the cooling liquid as it leaves an engine from its normal circulation path and into a car heating circulation path extending from the engine along the train and thence back to the engine, drawing off a portion of the diverted liquid at at least one of the cars traversed by said car heating circulation path and passing the drawn off portion through a radiator disposed within the car, and returning said drawn off portion to the side of the car heating circulation path en route back to the engine, the improvement which comprises providing a make up liquid supply and introducing make up liquid into that part of the system between the return portion of the car heating circulation path and the engine.

3. In a method of utilizing waste heat of locomotives powered by internal combustion prime mover means having combustion chamber cooling means employing a circulating liquid and a heat dissipating radiator; said method comprising diverting at least a portion of the liquid as it leaves an engine into a car heating liquid circuit extending longitudinally of a train pulled by the locomotive, drawing off portions of the diverted liquid and directing the drawn off portions through heat exchange apparatus in at least some of the cars in the train, and then directing said drawn off portions of liquid back to the engine for absorption of engine heat, the improvement which comprises introducing make up fluid as required to that portion of the system between the return portion of the car heating circuit and the fluid entrant side of the prime mover means.

4. An organized apparatus for heating trains with the waste heat of a locomotive powered by an internal combustion engine having a combustion chamber cooling means including a water jacket connected in series with a radiator and a circulation inducing means interposed between the water jacket and the radiator; said apparatus comprising a vertically disposed manifold connected in parallel with the engine radiator, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a make up reservoir connected to deliver fluid to the fluid entrant side of said water jacket, and liquid level actuated means in said manifold effective to admit fluid from said reservoir only when the fluid level in said manifold is below a predetermined level.

5. An organized apparatus for heating trains with the waste heat of a locomotive powered by an internal combustion engine having a combustion chamber cooling means including a water jacket connected in series with a radiator and a circulation inducing means interposed between the water jacket and the radiator; said apparatus comprising a vertically disposed manifold connected in parallel with the engine radiator, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, thermo-responsive means carried by said manifold and devices operated thereby effective to prevent operation of said pump by said motor when the liquid in said manifold is below a predetermined temperature, and means effective to supply make up fluid to said apparatus at the fluid entrant side of said water jacket.

6. An organized apparatus for heating trains with the waste heat of a locomotive powered by an internal combustion engine having a combustion chamber cooling means including a water jacket connected in series with a radiator and a circulation inducing means interposed between the water jacket and the radiator; said apparatus comprising a vertically disposed manifold connected in parallel with the engine radiator, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, and a liquid level responsive switch on said manifold and devices actuated by said switch effective to prevent operation of said pump when the liquid in said manifold falls below a predetermined level.

7. An organized apparatus for heating trains with the waste heat of a locomotive powered by an internal combustion engine having a cylinder cooling means including a water jacket connected in series with a radiator and a circulation inducing means interposed between the water jacket and the radiator; said apparatus comprising a vertically disposed manifold connected in parallel with the engine radiator, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level.

8. An organized apparatus for heating trains with the waste heat of a locomotive powered by an internal combustion engine having a cylinder cooling means including a water jacket connected in series with a radiator and a circulation inducing means interposed between the water jacket and the radiator; said apparatus comprising a vertically disposed manifold connected in parallel with the engine radiator, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level; said thermo-responsive means being disposed below the juncture of said other conduit means and said manifold and said liquid level responsive means being disposed above said juncture.

9. An organized apparatus for heating trains with the waste heat of a locomotive powered by an internal combustion engine having a water jacket connected in series with a radiator and a circulation inducing means interposed between the water jacket and the radiator; said apparatus comprising a vertically disposed manifold having the lower portion thereof connected to that portion of the engine cooling circuit extending between the radiator outlet and the water jacket, a thermo-responsive diverter valve having an inlet connected to receive liquid from the water jacket, a first outlet connected to deliver liquid to the radiator inlet, a second outlet connected to deliver liquid to the upper portion of said manifold and thermo-responsive valve means effective to maintain said first outlet closed and said second outlet open so long as the liquid passing therethrough remains below a predetermined temperature, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold a fluid make up supply reservoir connected to said apparatus, and means in said manifold operable to permit fluid flow from said reservoir into said apparatus when the fluid level in said manifold drops below a predetermined level.

10. An organized apparatus for heating trains with the waste heat of a locomotive powered by an internal combustion engine having a water jacket connected in series with a radiator and a circulation inducing means interposed between the water jacket and the radiator; said apparatus comprising a vertically disposed manifold having the lower portion thereof connected to that portion of the engine cooling circuit extending between the radiator outlet and the water jacket, a thermo-responsive diverter valve having an inlet connected to receive liquid from the water jacket, a first outlet connected to deliver liquid to the radiator inlet, a second outlet connected to deliver liquid to the upper portion of said manifold and thermo-responsive valve means effective to maintain said first outlet closed and said second outlet open so long as the liquid passing therethrough remains below a predetermined temperature, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, and thermo-responsive means carried by said manifold and devices operated thereby effective to prevent operation of said motor when the liquid in said manifold is below a predetermined temperature.

11. An organized apparatus for heating trains with the waste heat of a locomotive powered by an internal combustion engine having a water jacket connected in series with a radiator and a circulation inducing means interposed between the water jacket and the radiator; said apparatus comprising a vertically disposed manifold having the lower portion thereof connected to that portion of the engine cooling circuit extending between the radiator outlet and the water jacket, a thermo-responsive diverter valve having an inlet connected to receive liquid from the water jacket, a first outlet connected to deliver liquid to the radiator inlet, a second outlet connected to deliver liquid to the upper portion of said manifold and thermo-responsive valve means effective to maintain said first outlet closed and said second outlet open so long as the liquid passing therethrough remains below a predetermined temperature, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, and a liquid level responsive switch on said manifold and devices actuated by said switch effective to prevent operation of said pump when the liquid in said manifold falls below a predetermined level.

12. An organized apparatus for heating trains with the waste heat of a locomotive powered by an internal combustion engine having a water jacket connected in series with a radiator and a circulation inducing means interposed between the water jacket and the radiator; said apparatus comprising a vertically disposed manifold having the lower portion thereof connected to that portion of the engine cooling circuit extending between the radiator outlet and the water jacket, a thermo-responsive diverter valve having an inlet connected to receive liquid from the water jacket, a first outlet connected to deliver liquid to the radiator inlet, a second outlet connected to deliver liquid to the upper portion of said manifold and thermo-responsive valve means effective to maintain said first outlet closed and said second outlet open so long as the liquid passing therethrough remains below a predetermined temperature, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level.

13. An organized apparatus for heating trains with the waste heat of a locomotive powered by an internal combustion engine having a water jacket connected in series with a radiator and a circulation inducing means interposed between the water jacket and the radiator; said apparatus comprising a vertically disposed manifold having the lower portion thereof connected to that portion of the engine cooling circuit extending between the radiator outlet and the water jacket, a thermo-responsive diverter valve having an inlet connected to receive liquid from the water jacket, a first outlet connected to deliver liquid to the radiator inlet, a second outlet connected to deliver liquid to the upper portion of said manifold and thermo-responsive valve means effective to maintain said first outlet closed and said second outlet open so long as the liquid passing therethrough remains below a predetermined temperature, a liquid outflow pipe and a liquid return flow pipe each extending longitudinally of the locomotive; each of said pipes at at least one end thereof having connecting means operable to effect connection with corresponding pipes carried by cars to be pulled by the locomotive and heated by heated engine jacket liquid, conduit means connecting the lower portion of said manifold with said return flow pipe, other conduit means connecting the upper portion of said manifold with said liquid outflow pipe, a pump interposed in said other conduit means and having the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level; said thermo-responsive means being disposed below the juncture of said other conduit means and said manifold and said liquid level responsive means being disposed above said juncture.

14. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive and connected in parallel relation with the engine radiator, conduit means connecting the lower portion of said manifold with said locomotive return flow pipe, other conduit means connecting the upper portion of said manifold with said locomotive outflow pipe, a pump interposed in said other conduit means with the intake orifice thereof disposed on the side thereof adjacent said manifold, and a make up reservoir connected to deliver make up fluid to said apparatus at a point between said manifold and said water jacket.

15. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive and connected in parallel relation with the engine radiator, conduit means connecting the lower portion of said manifold with said locomotive return flow pipe, other conduit means connecting the upper portion of said manifold with said locomotive outflow pipe, a pump interposed in said other conduit means with the intake orifice thereof disposed on the side thereof adjacent said manifold, a driving motor deriving power from a source of electrical energy and operatively connected to said pump, and thermo-responsive means carried by said manifold and devices operated thereby effective to prevent operation of said motor when the liquid in said manifold is below a predetermined temperature.

16. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive and connected in parallel relation with the engine radiator, conduit means connecting the lower portion of said manifold with said locomotive return flow pipe, other conduit means connecting the upper portion of said manifold with said locomotive outflow pipe, a pump interposed in said other conduit means with the intake orifice thereof disposed on the side thereof adjacent said manifold, a driving motor deriving power from a source of electrical energy and operatively connected to said pump, and a liquid level responsive switch on said manifold and devices actuated by said switch effective to prevent operation of said pump when the liquid in said manifold falls below a predetermined level.

17. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallell between the outflow and return flow pipes thereof, a vertically disposed manifold carried by the locomotive and connected in parallel relation with the engine radiator, conduit means connecting the lower portion of said manifold with said locomotive return flow pipe, other conduit mens connecting the upper portion of said manifold with said locotomtive outflow pipe, a pump interposed in said other conduit means with the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a perdetermined level.

18. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive and connected in parallel relation with the engine radiator, conduit means connecting the lower portion of said manifold with said locomotive return flow pipe, other conduit means connecting the upper portion of said manifold with said locomotive outflow pipe, a pump interposed in said other conduit means with the intake orifice thereof disposed on the side thereof adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level; said thermo-responsive means being disposed below the juncture of said other conduit means and said manifold and said liquid level responsive means being disposed above said juncture.

19. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive, a thermo-responsive diverter valve having an inlet orifice connected to receive liquid from the engine water jacket, a first outlet connected to deliver liquid to the inlet side of the engine radiator, a second outlet orifice connected to deliver liquid to the upper portion of said manifold, and thermo-responsive valve means effective to maintain said first outlet closed and said second outlet open so long as the liquid passing therethrough remains below a predetermined temperature, a first conduit means connecting the lower portion of said manifold with the outlet side of the engine radiator, a second conduit means connecting the lower portion of said manifold with said return flow pipe of the locomotive, other conduit means connecting the upper portion of said manifold with said liquid return flow pipe of the locomotive, a pump interposed in said other conduit means with the intake orifice thereof disposed adjacent said manifold, a make up reservoir connected to deliver make up fluid to said apparatus at a point between said manifold and said water jacket, and devices carried by said manifold operable to regulate the flow of make up fluid into said apparatus.

20. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive, a thermo-responsive diverter valve having an inlet orifice connected to receive liquid from the engine water jacket, a first outlet connected to deliver liquid to the inlet side of the engine radiator, a second outlet orifice connected to deliver liquid to the upper portion of said manifold, and thermo-responsive valve means effective to maintain said first outlet closed and said second outlet open so long as the liquid passing therethrough remains below a predetermined temperature, a first conduit means connecting the lower portion of said manifold with the outlet side of the engine radiator, a second conduit means connecting the lower portion of said manifold with said return flow pipe of the locomotive, other conduit means connecting the upper portion of said manifold with said liquid return flow pipe of the locomotive, a pump interposed in said other conduit means with the intake orifice thereof disposed adjacent said manifold, a driving motor deriving power from a source of electrical energy and operatively connected to said pump, thermo-responsive means carried by said manifold and devices operated thereby effective to prevent operation of said pump by said motor when the liquid in said manifold is below a predetermined temperature, a make up reservoir connected to said apparatus, and means for admitting fluid flow from said reservoir into said apparatus only when the fluid level in said manifold is below a predetermined level.

21. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive, a thermo-responsive diverter valve having an inlet orifice connected to receive liquid from the engine water jacket, a first outlet connected to deliver liquid to the inlet side of the engine radiator, a second outlet orifice connected to deliver liquid to the upper portion of said manifold, and thermo-responsive valve means effective to main said first outlet closed and said second outlet open so long as the liquid passing therethrough remains below a predetermined temperature, a first conduit means connecting the lower portion of said manifold with the outlet side of the engine radiator, a second conduit means connecting the lower portion of said manifold with said return flow pipe of the locomotive, other conduit means connecting the upper portion of said manifold with said liquid return flow pipe of the locomotive, a pump interposed in said other conduit means with the intake orifice thereof disposed adjacent said manifold, a driving motor deriving power from a source of electrical energy and operatively connected to said pump, and a liquid level responsive switch on said manifold and devices actuated by said switch effective to prevent operation of said pump when the liquid in said manifold falls below a predetermined level.

22. An organized apparatus for heating railway cars with the waste heat of a locomotive powered by an internal combustion prime mover having cooling means including a water jacket connected in series with a radiator and a circulation inducing means interposed between the radiator and the water jacket; said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive, a thermo-responsive diverter valve having an inlet orifice connected to receive liquid from the engine water jacket, a first outlet connected to deliver liquid to the inlet side of the engine radiator, a second outlet orifice connected to deliver liquid to the upper portion of said manifold, and thermo-responsive valve means effective to maintain said first outlet closed and said second outlet open so long as the liquid passing therethrough remains below a predetermined temperature, a first conduit means connecting the lower portion of said manifold with the outlet side of the engine radiator, a second conduit means connecting the lower portion of said manifold with said return flow pipe of the locomotive, other conduit means connecting the upper portion of said manifold with said liquid return flow pipe of the locomotive, a pump interposed in said other conduit means with the intake orifice thereof disposed adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level.

23. An organized apparatus for heating railway cars with the waste heat of a locomotive powered by an internal combustion prime mover having cooling means including a water jacket connected in series with a radiator and a circulation inducing means interposed between the radiator and the water jacket, said apparatus comprising a liquid outflow pipe extending longitudinally of the locomotive from end to end thereof and having connecting means at each end thereof operable to be connected with a corresponding pipe carried by a car to be heated, a liquid return flow pipe extending parallel to said liquid outflow pipe and having connecting means at each end thereof operable to be connected to a corresponding pipe carried by a car to be heated; each car to be heated having liquid outflow and liquid return flow pipes extending from end to end thereof; each of said pipes having connecting means at each end thereof operable to effect connection with said connecting means carried by said liquid outflow and liquid return flow pipes of the locomotive, heat exchange means within each car connected in parallel between the outflow and return flow pipes thereof, a vertically disposed manifold carried by the locomotive, a thermo-responsive diverter valve having an inlet orifice connected to receive liquid from the engine water jacket, a first outlet connected to deliver liquid to the inlet side of the engine radiator, a second outlet orifice connected to deliver liquid to the upper portion of said manifold, and thermo-responsive valve means effective to maintain said first outlet closed and said second outlet open so long as the liquid passing therethrough remains below a predetermined temperature, a first conduit means connecting the lower portion of said manifold with the outlet side of the engine radiator, a second conduit means connecting the lower portion of said manifold with said return flow pipe of the locomotive, other conduit means connecting the upper portion of said manifold with said liquid return flow pipe of the locomotive, a pump interposed in said other conduit means with the intake orifice thereof disposed adjacent said manifold, a driving motor deriving power from a source of electrical energy and operatively connected to said pump, a motor control means interposed between said motor and said source of energy, thermo-responsive means carried by said manifold and electrically connected to said control means, liquid level responsive means carried by said manifold and also electrically connected to said control means; said thermo-responsive means and said liquid level responsive means being effective to actuate said control means to prevent operation of said motor and said pump when the liquid in said manifold is below a predetermined temperature or is below a predetermined level; said thermo-responsive means being disposed below the juncture of said other conduit means and said manifold and said liquid level responsive means being disposed above said juncture.

24. An organized apparatus for heating trains as claimed in claim 4 including a car coupled to said locomotive; said car having fluid outflow and return flow pipes connected, respectively, to the fluid outflow and return flow pipes of said locomotive, and said car further having heat exchange means connected to and affording means for fluid flow from the fluid outflow pipe of said car to the return flow pipe thereof.

25. An organized apparatus for heating trains as claimed in claim 6 including a car coupled to said locomotive; said car having fluid outflow and return flow pipes connected, respectively, to the fluid outflow and return flow pipes of said locomotive, and said car further having heat exchange means connected to and affording means for fluid flow from the fluid outflow pipe of said car to the return flow pipe thereof.

References Cited in the file of this patent

UNITED STATES PATENTS

| | | |
|---|---|---|
| 491,482 | Healy | Feb. 7, 1893 |
| 1,439,223 | Boltshauser | Dec. 19, 1922 |
| 2,332,149 | Horton | Oct. 19, 1943 |
| 2,550,822 | Kielland | May 1, 1951 |

FOREIGN PATENTS

| | | |
|---|---|---|
| 453,717 | Great Britain | Sept. 17, 1936 |